Figure 1:
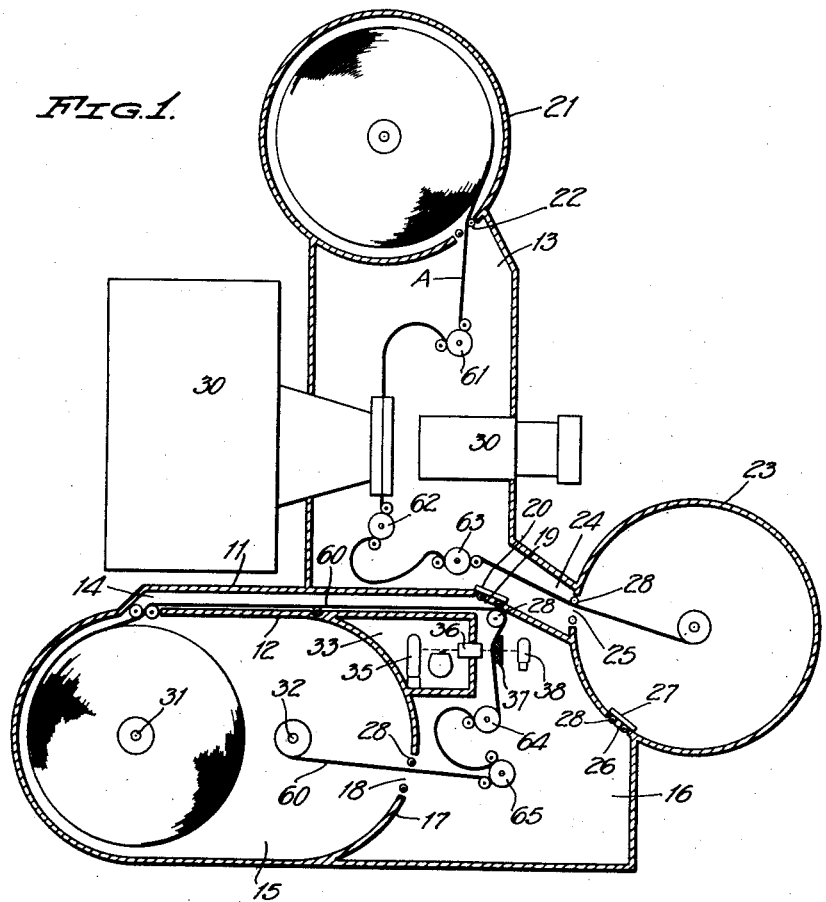

May 25, 1943.  M. LOPEZ-HENRIQUEZ  2,320,188
PROJECTOR
Filed April 18, 1940   2 Sheets-Sheet 1

MIGUEL LOPEZ-HENRIQUEZ.
INVENTOR.
BY Ely Pattison,
ATTORNEYS.

May 25, 1943.　　M. LOPEZ-HENRIQUEZ　　2,320,188
PROJECTOR
Filed April 18, 1940　　2 Sheets-Sheet 2
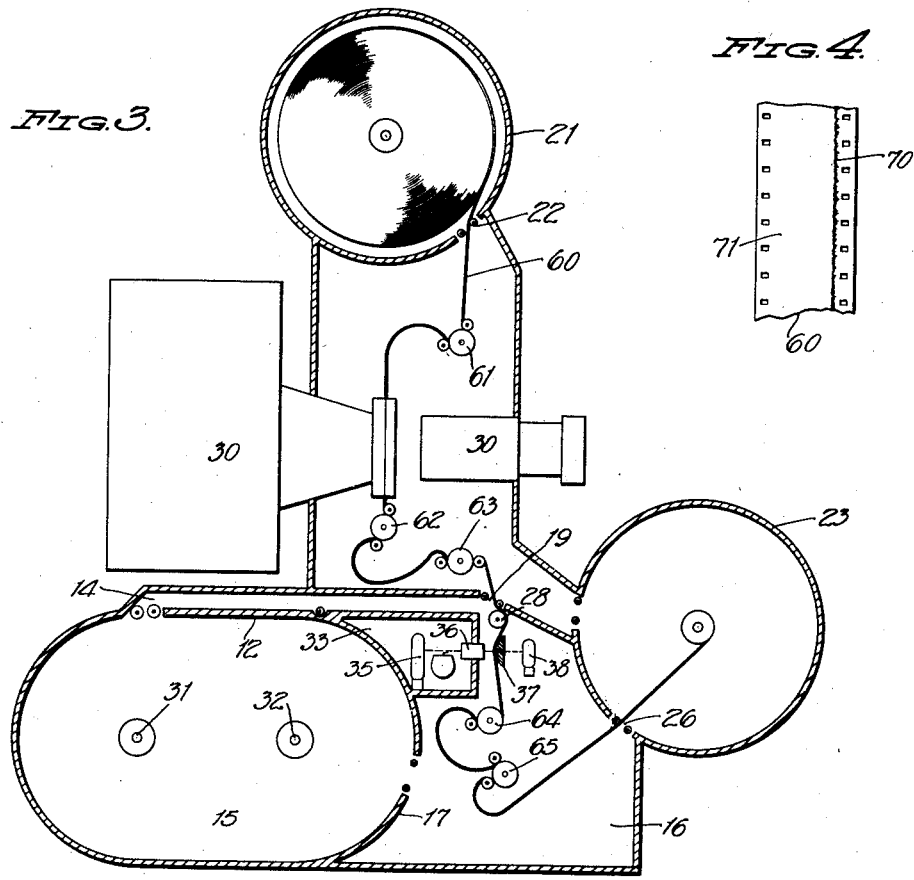
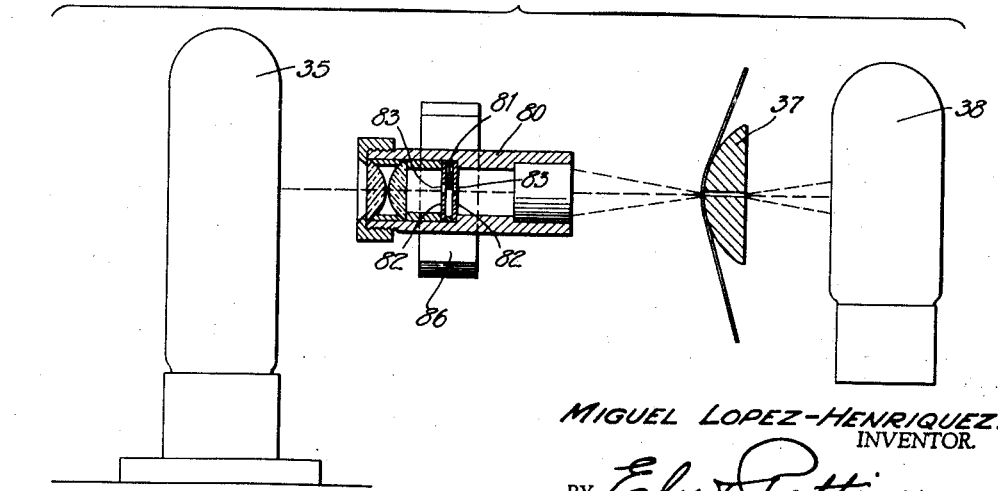
MIGUEL LOPEZ-HENRIQUEZ.
INVENTOR.
BY Ely Pattison
ATTORNEYS.

Patented May 25, 1943

2,320,188

UNITED STATES PATENT OFFICE 2,320,188

PROJECTOR

Miguel Lopez-Henriquez, New York, N. Y.

Application April 18, 1940, Serial No. 330,279

2 Claims. (Cl. 88—16.2)

This invention relates to motion picture projectors and sound reproducing mechanisms and particularly it pertains to a projector for use by amateur photographers.

It is an object of the invention to provide a novel motion picture projecting apparatus, the use of which will permit of a person making his own sound record upon a picture film strip in the same apparatus or unit by which a picture is projected.

Another object of the invention is to provide a projector with which a silent picture may be projected and a sound recording simultaneously made and, after the sound recording has been completed, the same projector may be used for projecting the picture and reproducing the sound recording.

Still another object of the invention resides in a novel construction which permits of the making of a positive picture and sound film strip by employing but two film strips instead of three, as is the general practice.

With the above and other objects in view, reference will be had to the accompanying drawings, wherein is illustrated one embodiment of the invention and the following detailed description thereof.

Figure 2:
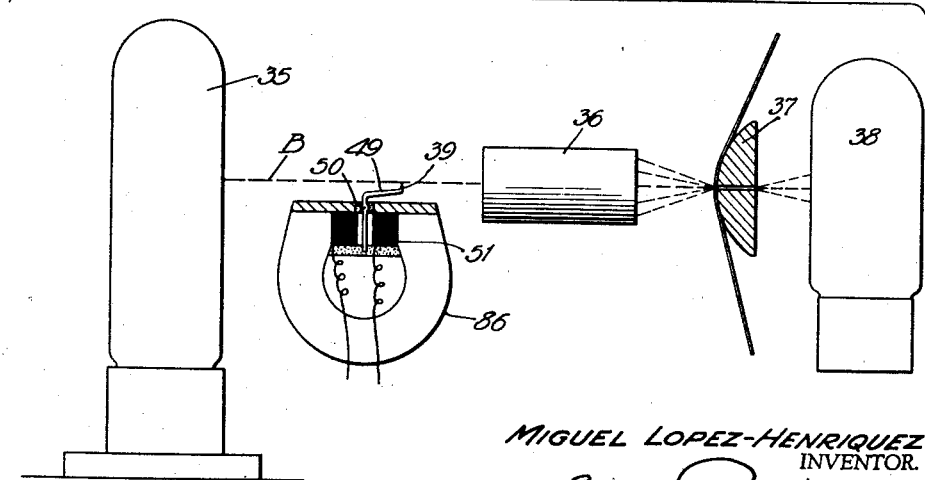

In the drawings:

Figure 1 is a vertical sectional view of a projector constructed in accordance with the present invention, the figure illustrating the projector and its manner of use to simultaneously project a picture from a positive film and to record a sound record upon a sensitive film, Figure 2 is a schematic view upon an enlarged scale illustrating the sound recording and reproducing apparatus, Figure 3 is a vertical sectional view of the projector illustrating the manner in which it is employed to simultaneously project a picture and reproduce a sound recording from a positive film, Figure 4 is a detail fragmentary view illustrating a section of a film strip after the sound recording has been made thereon, but prior to the printing of the picture record thereon, and;

Figure 5 is a schematic view on an enlarged scale illustrating a modified form of sound recording and reproducing apparatus.

A projector constructed in accordance with the present invention comprises a housing of the general shape and form illustrated in Figures 1 and 3 of the drawings.

The housing is divided by two spaced walls 11 and 12 into an upper compartment 13 and a lower compartment, which latter is divided into two sections 15 and 16 by a partition or the like 17. The space between the walls 11 and 12 provides a passageway 14 which establishes one means of communication between the sections 15 and 16 of the divided compartment, a second means of communication between the sections of the divided compartment being provided by an opening 18 in the partition 17. The compartment 13 has communication with the passage 14 by means of a suitable opening 19 in the wall 11, which opening may be closed by means of a slide or other suitable door 20.

Carried by the housing there is a positive film magazine 21 which has communication with the compartment 13 by means of a suitable opening 22. The reference character 23 designates a positive film take-on magazine and this magazine has communication with the compartment 13 by means of a relatively short passage 24 and an opening 25. The positive film take-on magazine 23 also has communication with the section 16 of the divided compartment by means of an opening 26 which may be closed by a slide or other suitable door 27. Suitable film strip guide rollers 28 are employed at various points in order that the film strips may be guided in the course of their movement without damage thereto.

Mounted in the compartment 13 there is a suitable projecting mechanism 30 and a portion of a film feeding mechanism all of which may be of the conventional form operated in the conventional manner.

Mounted in the section 15 of the divided compartment, there are two shafts 31 and 32, the shaft 31 constituting a sensitive film feed, while the shaft 32 constitutes a sensitive film take-on and may be driven in any desired manner as for instance, by belt or gear train from a suitable driving motor not herein illustrated.

Mounted within the section 16 of the divided compartment, there is a housing 33 within which is mounted a portion of a sound recording and reproducing assembly, this entire assembly being more clearly illustrated in Figure 2 of the drawings.

The sound recording and reproducing assembly includes an exciter lamp 35, an optical assembly 36, a slit bar or block 37 which serves to guide and steady the film in its movement through the path of the light beam, a photoelectric cell 38 and a light beam intercepting element 39. The light beam intercepting element 39 is in the form of a substantially right angular arm 49, pivotally mounted as at 50 which is rocked about said pivotal point 50 into and out of the light beam B by means of an electro-magnetic element 51.

I will now describe the manner in which the device operates.

Referring to Figure 1, we will assume for the purpose of illustration, that the film strip designated A is one which has been previously exposed and developed in the ordinary manner and that it is desired to reproduce said film with a sound recording associated therewith.

A sensitive or unexposed film 60 is placed upon the sensitive film feed shaft 31 and is threaded through the passageway 14 in the presence of the sound recording and reproducing assembly to the sensitive film take-on 32.

The film strip A is placed in the positive film feed magazine and threaded through the projector assembly 30 to the positive film take-on magazine.

The positive film strip A is moved or advanced relatively to the projector assembly by two sets of feed mechanisms 61 and 62 and to the positive film take-on magazine by a third feed mechanism 63 all of which feed mechanisms being of conventional form and simultaneously operated in a conventional manner.

The sensitive film strip 60 is moved or advanced relatively to the sound recording and reproducing assembly by a feed mechanism 64 and to the sensitive film take-on, by a feed mechanism 65, and these feed mechanisms 64 and 65 are driven simultaneously and in synchrony with the feed mechanisms 61, 62 and 63.

With the film strips adjusted as above described, the machine is put into operation by supplying power to the film strip feed mechanisms by a suitable motor, not herein illustrated.

As the feed mechanisms are set in operation the film strip A is advanced through the projecting assembly 30 and the picture records thereon are projected upon a screen. Simultaneously with this operation, the sensitive film strip 60 is advanced in the presence of the sound recording and reproducing assembly, the film strip A being wound upon the take-on mechanism in the take-on magazine 23, the sensitive film strip 60 being wound upon the take-on mechanism 32 in the section 15 of the divided compartment.

It will be understood that when the device is operating as above described, the sound recording and reproducing assembly is operated as a sound recording means and that simultaneously with the projection of the record of the film strip A, the operator talking into a microphone, operatively connected with the sound recording and reproducing assembly, will impress upon the sensitive film strip 60, a sound recording. It will also be understood that the opening in the slit bar or block 37 is relatively small and so positioned that only a slight section such as designated 70 in Figure 4 of the drawings will be exposed for the sound recording, the remaining portion of the film, designated 71, remainining sensitive for a purpose to be hereinafter described.

It will be understood that the operation just described is solely for the purpose of impressing the sound recording upon the sensitive film strip 60 which sound recording would be of a nature appropriate to the subject matter of the film strip A.

After the sound recording has been completed in the manner above described, the film strip A and the sensitive film strip 60 are removed from the projector and transferred to a conventional printing machine in which the recordings upon the film strip A are printed upon the sensitive portion 71 of the sensitive film 60 after which the film 60 is developed in the usual manner fixing both the sound recording and the subject matter transferred thereto from the film strip A.

Thus it will be apparent that the film strip 60 which carries both the subject matter of the film strip A and the sound recording, is the result of the use of but two film strips instead of three film strips as are generally employed. Further, it will be obvious that the sound recording has been accomplished in a projector simultaneously with the projection of the subject matter carried by a film strip having no recording thereon.

With reference now to Figure 3, it will be obvious that the film strip 60, after having been developed, may be placed in the positive film feed magazine 21, threaded through the film feed mechanism 61, the projecting mechanism 30, film feed mechanisms 62 and 63, through the opening 19 in the wall 11, into the section 16 of the divided compartment, over the slit bar or block 37 in the presence of the sound recording and reproducing assembly and through the feed mechanisms 64 and 65 to the positive film take-on magazine 23.

With the film strip assembled as just described, motion imparted to the several feed mechanisms will advance the film strip 60 in the presence of the projecting mechanism 30, and the sound recording and reproducing assembly, and will simultaneously project the subject matter impressed upon the portion 71 of the film 60 and the sound recording 70 carried by the film 60, it being understood that the sound recording and reproducing assembly will under such circumstances be operated as a sound reproducing mechanism.

In the modified form of the invention illustrated in Figure 5, the light beam intercepting element is designated 81 and is combined with the optical assembly 80. It consists of two spaced partitions 82 each of which has an opening 83 therein, the partitions being so arranged that the openings 83 are in alinement with each other. The light beam intercepter 81 is in the form of a pivoted lever which is operated electromagnetically by a conventional mechanism enclosed within a suitable housing 86, and is moved thereby between the partitions 82 into position to intercept the light beam as it passes from the exciter lamp 35 to the photo-electric cell 38.

From the foregoing it will be apparent that the present invention provides a device which in addition to operating as an ordinary projector, may be also employed to record sound simultaneously with the projection of the subject matter of a positive film strip and which may also be operated to project the subject matter of a positive film strip and reproduce a sound recording impressed thereon.

Having thus described my invention, what is claimed as new, is:

1. A projector of the type described comprising a housing divided into upper and lower communicating compartments, means for dividing the lower compartment into two communicating sections, a positive film feed magazine having communication with the upper compartment, a film take-on magazine having communication with the upper compartment, a picture projecting assembly associated with the upper compartment, a negative film feed and a negative film take-on arranged in one of the sections of the lower compartment, a sound recording and reproducing assembly arranged in the other section of the lower compartment, and a film strip feeding mechanism for feeding simultaneously a positive film from the positive film feed magazine through the upper compartment to the positive film take-on magazine and a negative film from the negative film feed to the negative film take-on in the presence of the sound recording and reproducing assembly, or a single positive film from the positive film feed magazine through the upper and lower compartments to the positive film take-on magazine and in the presence of the sound recording and reproducing assembly.

2. In a projector of the type described in combination, a housing divided into two communicating compartments, means for dividing one of said compartments into two communicating sections, a positive film feed magazine having communication with the undivided compartment, a positive film take-on magazine having communication with the undivided compartment and one of the sections of the divided compartment, a negative film feed and a negative film take-on in one of the sections of the divided compartment of the housing, a sound recording and reproducing assembly in the other section of the divided compartment of the housing, and film feeding mechanism for feeding a positive film strip from the positive film feed magazine through the undivided compartment of the housing in the presence of the picture projecting assembly to the positive film take-on magazine and a negative film strip from the negative film feed in one of the sections of the divided compartment through the other section of the divided compartment in the presence of the sound recording and reproducing assembly to the negative film take-on, or a positive film strip from the positive film feed through the undivided compartment in the presence of the picture projecting assembly and through one of the sections of the divided compartment in the presence of the sound recording and reproducing assembly to the positive film take-on magazine.

MIGUEL LOPEZ-HENRIQUEZ.